US005920533A

United States Patent [19]

Honma

[11] Patent Number: 5,920,533

[45] Date of Patent: Jul. 6, 1999

[54] CLOCK SIGNAL EXTRACTION SYSTEM FOR HIGH DENSITY RECORDING APPARATUS

[75] Inventor: Hiromi Honma, Tokyo, Japan

[73] Assignee: NEC Corporation, Japan

[21] Appl. No.: 08/653,760

[22] Filed: May 23, 1996

[30] Foreign Application Priority Data

May 26, 1995 [JP] Japan .................................... 7-152296

[51] Int. Cl.[6] ..................................................... G11B 20/14

[52] U.S. Cl. ................................ 369/59; 369/60; 369/48; 360/51; 331/17

[58] Field of Search ................................. 360/51, 32, 46, 360/45; 369/59, 60, 47, 48; 364/724.16; 341/155; 331/17

[56] References Cited

U.S. PATENT DOCUMENTS

| | | | |
|---|---|---|---|
| 4,736,238 | 4/1988 | Moriyama et al. | 386/34 |
| 4,945,538 | 7/1990 | Patel | 371/43 |
| 5,363,352 | 11/1994 | Tobita et al. | 369/47 |
| 5,432,820 | 7/1995 | Sugawara et al. | 375/341 |

FOREIGN PATENT DOCUMENTS

| | | |
|---|---|---|
| 362753 | 3/1991 | Japan . |
| 3-176865 | 7/1991 | Japan . |
| 4-69868 | 3/1992 | Japan . |
| 4-90168 | 3/1992 | Japan . |
| 4-341928 | 11/1992 | Japan . |
| 629785 | 2/1994 | Japan . |

*Primary Examiner*—Aristotelis M. Psitos
*Assistant Examiner*—Alan Faber
*Attorney, Agent, or Firm*—Ostrolenk, Faber, Gerb & Soffen, LLP

[57] ABSTRACT

The invention provides a clock signal extraction circuit which can extract a synchronizing clock signal accurately from a readout waveform reproduced from information recorded in a high density and which includes substantial intersymbol interferences. An analog readout signal is converted into binary information with a synchronizing clock signal from a voltage controlled oscillator. A replica signal is produced from the binary information by a waveform replica production circuit while time corrected readout waveform data are produced from the analog readout signal by a delay circuit, and a phase amount is detected from the time corrected readout waveform data and the replica signal by a phase amount detection circuit. The base amount is used to control the voltage controlled oscillator, thereby forming a phase locked loop to perform a follow-up operation to the readout signal.

5 Claims, 13 Drawing Sheets

8
D
D
D
D
$\alpha_2$
$\alpha_1$
$\alpha_0$
$\alpha_1$
$\alpha_2$
PULSE SEQUENCE bn
0001000
REPLICA SIGNAL Zn $y_n$
$z_n$
D
9
10
10'
11
12
13
LEVEL DETECTOR
$V_1$
$V_2$
$a_n$
$w_n$
$w_n/a_n$
$S_n$
$\theta_n$
$\theta_{n-1}$
D
g'
+
−

WAVEFORM INPUT
BRANCH METRIC PRODUCTION CIRCUIT
14
ACS CIRCUIT
15₁
15₂
15₃
15₄
PATH METRIC CIRCUIT
16
D1
D2
D3
D4
PM1
PM2
PM3
PM4
MAXIMUM LIKELIHOOD DISCRIMINATION CIRCUIT
17
DETECTION OUTPUT

READOUT WAVEFORM
PULSE GENERATION
2
VCO
7
SYNCHRONIZING CLK
LOOP FILTER
6
$b_n$
WAVEFORM REPLICA PRODUCTION
3
DELAY CIRCUIT
4
z
y
PHASE AMOUNT CALCULATION
5
θ y
z
19
20
w
a
w/a
11
12
12a
12b
12c
12d
12e
V1
V2
S
13
S/H
21
θ

SAMPLE VALUE SIGNAL yn
REPLICA SIGNAL zn
DIFFERENCE SIGNAL wn
DIFFERENCE SIGNAL an
V1
V2
LEVEL SIGNAL sn
PHASE INFORMATION θn
0

REPLICA SIGNAL $z_n$
SAMPLE VALUE SIGNAL $y_n$
DIFFERENCE SIGNAL $W_n$
DIFFERENCE SIGNAL $a_n$
V1
V2
LEVEL SIGNAL $S_n$
PHASE INFORMATION $\theta_n$
0

REPLICA SIGNAL $z_n$
SAMPLE VALUE SIGNAL $y_n$
DIFFERENCE SIGNAL $w_n$
DIFFERENCE SIGNAL $a_n$
V1
V2
LEVEL SIGNAL $S_n$
PHASE INFORMATION $\theta_n$
0

PULSE DATA
REF
22
PHASE COMPARATOR
6
LOOP FILTER
7
VCO
PCLK
CHANNEL CLOCK

CLOCK SIGNAL EXTRACTION SYSTEM FOR HIGH DENSITY RECORDING APPARATUS

BACKGROUND OF THE INVENTION

1. Field of the Invention

This invention relates to a clock signal extraction system, and more particularly to a phase locked loop (PLL) circuit which extracts a clock signal from a readout signal in an apparatus for recording and reproducing high density information onto and from a recording medium in the form of a disk.

2. Description of the Related Art

In recent years, with the improvement in performance of computers, large capacity file apparatuses such as hard disk drives (HDD) and CD-ROM (compact disk read only memory) drives have exhibited a remarkable spread.

When information digitally recorded in a high density format on a recording medium is reproduced, a synchronizing clock signal is extracted from a reproduced analog signal and the digital information is detected using the clock signal. Detected information, particularly from a data filing system, is required to have a high degree of reliability, i.e., having an accuracy represented by a bit error rate of lower than $10^{-5}$ with regard to an optical disk and lower than $10^{-9}$ with regard to a magnetic disk. Accordingly, the clock signal must be extracted following up irregular rotation of a spindle accurately. Where the clock signal includes jittering, the reliability of the disk system deteriorates significantly.

FIG. 13 shows a conventional PLL circuit. Referring to FIG. 13, a phase comparator 22 compares the phases of an input signal REF to the PLL circuit with an output clock signal PCLK of the PLL circuit and outputs a phase error signal. High frequency components of the phase error signal are suppressed by a loop filter 6, and an output signal of the loop filter 6 is supplied as a control voltage to a voltage controlled oscillator (VCO) 7.

The VCO 7 outputs a clock signal PCLK of a frequency corresponding to the output voltage of the loop filter 6. The clock signal PCLK is fed back to the phase comparator 22, thereby forming a closed loop for automatically controlling the frequency and the phase difference.

In order to cope with multi-media requirements, further reduction in size and increase in density Is required for present day data filing systems. Given an optical disk onto and from which information is recorded and reproduced using a beam spot having a diameter which increases in proportion to the wavelength of the laser and in inverse proportion to the numerical aperture (NA) of the objective lens, it is difficult to achieve an increase in recording density by simply reducing the beam diameter because of problems with thermal noise and/or tilting.

In order to realize high density recording with a hard disk, the head must be small and a head floating amount (on the order of sub-microns) must be realized. Therefore it is difficult to raise the signal quality.

Recently, a partial response maximum likelihood (PRML) signal processing technique (in which a partial response method is used for equalization to shape a readout waveform and viterbi detection, which is a maximum likelihood detection method or the like, is used for detection of data) has begun to be utilized. With the PRML signal processing technique, information can be reproduced well even from, for example, a readout waveform having an eye pattern which is in an almost collapsed condition. This is accomplished by applying viterbi detection, which has conventionally been used in the field of communications, to a disk system.

However, when data are reproduced from a recording medium recorded in a high density, a relatively low resolution results in low energy of a clock frequency (clock signal) included readout signal. Consequently, the signal to noise ratio (SNR) of the input signal to the PLL circuit is decreased. Consequently, sampling jitters are increased and the reliability of detected information is deteriorated.

Where the PRML signal processing technique is employed, indeed it is theoretically possible to detect data even from a waveform which has an insufficient resolution, but where excessive jittering occurs in a reproduced clock signal, the performance of the PRML signal processing technique cannot be extracted fully.

Accordingly, it is a significant subject of high density recording to extract a clock signal accurately from a waveform having an insufficient resolution.

SUMMARY OF THE INVENTION

It is an object of the present invention to provide a clock signal extraction circuit which can extract a synchronizing clock signal accurately from a readout waveform reproduced from information recorded in a high density and including significant intersymbol interference.

In order to attain the object described above, according to an aspect of the present invention, there is provided a clock signal extraction system for a high density recording apparatus which comprises sampling means for sampling an analog signal reproduced from a recording medium with a synchronizing clock signal, a pulse generation circuit for converting a sample signal from the sampling means into binary information, a waveform replica production circuit for producing a waveform signal free from a phase displacement from the binary information from the pulse generation circuit, a delay circuit for delaying the sample signal from the sampling means by a fixed time, a phase amount calculation circuit for calculating a phase displacement amount between an output of the waveform replica production circuit and an output of the delay circuit, a loop filter connected to an output of the phase amount calculation circuit, and a voltage controlled oscillator for generating the synchronizing clock signal while controlling a frequency of the synchronizing clock signal in response to an output of the loop filter.

Preferably, the waveform replica production circuit Includes a transversal filter.

Preferably, the phase amount calculation circuit includes a delay element for delaying the sample signal from the sampling means by one clock, a first subtractor for producing a difference signal between the sample signal and an output signal of the delay element, a level detector for comparing the difference signal with a threshold level, a second subtractor for producing a difference signal between the output of the waveform replica production circuit and the sample signal, a divider for dividing an output of the second subtractor by the output of the first subtractor, and a switch circuit for selectively outputting an output of the divider or a signal obtained by delaying the output of the divider by one clock using an output of the level detector as a switching control signal. In this instance, preferably the level detector compares the difference signal from the first subtractor with two threshold levels, and the switch circuit selectively outputs the signal obtained by delaying the output of the divider by one clock using the output of the level detector as a switching control signal when the output of the first subtractor is within a range between the two threshold levels.

Preferably, the pulse generation circuit is formed from a viterbi detector.

Preferably, the sampling means includes an analog to digital converter which converts the analog signal using the output signal of the voltage controlled oscillator as a sampling clock signal.

According to another aspect of the present invention, there is provided a clock signal extraction system for a high density recording apparatus which comprises a pulse generation circuit for converting an analog readout signal reproduced from a recording medium into binary information with a synchronizing clock signal, a waveform replica production circuit for producing a readout signal free from a phase displacement from the binary information from the pulse generation circuit, a delay circuit for delaying the analog readout signal by a fixed time, a phase amount calculation circuit for calculating a phase displacement amount between an output of the waveform replica production circuit and an output of the delay circuit, a loop filter connected to an output of the phase amount calculation circuit, and a voltage controlled oscillator for generating the synchronizing clock signal while controlling a frequency of the synchronizing clock signal in response to an output of the loop filter.

Preferably, the waveform replica production circuit includes a transversal filter, and a digital to analog converter.

Preferably, the phase amount calculation circuit includes a subtractor for producing a difference signal between the replica signal and the readout signal, a differentiation circuit for differentiating the readout signal, a divider for dividing an output of the subtractor by an output of the differentiation circuit, a level detector for comparing the output of the differentiator with a threshold level, and a switch circuit for selectively outputting an output of the divider or a preceding output of the phase amount calculation circuit obtained by sampling and holding the output of the phase amount calculation circuit using an output of the level detector as a switching control signal. In this instance, preferably the level detector compares the output of the differentiator with two threshold levels determined in advance, and the switch circuit selectively outputs the preceding output of the phase amount calculation circuit obtained by sampling and holding the output of the phase amount calculation circuit when the output of the differentiator is within a range between the two threshold levels.

According to a further aspect of the present invention, there is provided a clock signal extraction method for a high density recording disk system, which comprises the steps of converting a readout signal reproduced from a recording medium into data in the form of binary information with a synchronizing clock signal, producing a replica signal from the data by filtering processing of a substantially same characteristic as that of a reproduction system, time correcting the readout signal and differentiating the time corrected readout signal to obtain a differential signal, detecting a phase displacement amount based on the differentiation signal and a difference between the replica signal and the readout signal, and controlling a voltage controlled oscillator, which outputs the synchronizing clock signal, based on the phase displacement amount.

Preferably, a level of the differentiation signal of the readout signal is supervised, and when the level is within a range determined in advance, the phase displacement amount is set to the last value thereof.

The principle of the present invention and operation of the clock signal extraction system will be described in detail.

In accordance with the present invention, binary information detected by viterbi detection or the like from a readout signal reproduced from a recording medium is filtered by means of, for example, a transversal filter having a characteristic set so as to be the same as the channel characteristic between the head and the recording medium, thereby to produce a replica of the readout signal.

Usually, since the channel characteristic does not exhibit a great variation, there is no problem if It is considered that the channel characteristic is substantially fixed. Further, unless the recorded domain has some non-linearity, any channel characteristic can be regenerated with a transversal filter.

Since the replica signal which is an output of the transversal filter has an ideal readout waveform which has a zero phase difference from a clock signal, a phase displacement of the clock signal can be detected by comparison between the replica waveform and the original waveform of the readout signal.

FIG. 11 illustrates a relationship between the phase displacement amount and the amplitude value. Referring to FIG. 11, where the amplitude value of the readout signal at a certain point of time is represented by y, the differentiation coefficient at the point of time is represented by a, the amplitude of the replica waveform corresponding to y is represented by z, and the clock phase difference is represented by θ, the following equation (1) approximately holds:

$$\theta=(z-y)/a \tag{1}$$

Meanwhile, where the phase amount is calculated from a readout waveform data sequence $y_n$ obtained by sampling the readout signal, the differentiation coefficient $a_n$ is given by the following equation by approximation from sampled values:

$$a_n=(y_n-y_{n-1})/\Delta \tag{2}$$

$$\theta_n=(Z_n-y_n)\Delta/(y_n-y_n) \tag{3}$$

where Δ is a sampling period.

Accordingly, by calculating the phase displacement amount θ based on equation (1) or (3) above and controlling the clock frequency so as to correspond to the phase displacement amount θ, a PLL circuit which can reproduce information recorded in a high density on a recording medium can be constructed.

However, since a reciprocal number to the differentiation coefficient (or difference) is used in order to calculate the clock phase displacement θ, where the differentiation coefficient is in the proximity of 0, noise included in the difference (z - y) is amplified. Therefore, the level of the differentiation signal of the readout signal is monitored and, when the absolute value of the level is lower than δ (δ>0), switching is required to set the value of the clock phase displacement θ to 0 or to the preceding or last value.

Consequently, while a conventional PLL detects phase information only at a point of time when the code of a readout waveform exhibits a reversal, according to the present invention, phase information can be detected between several channel bits around a point of time at which the code exhibits a reversal. Accordingly, the clock signal extraction circuit of the present invention exhibits improved speed in pulling-in and in follow-up accuracy. It is estimated that, in reproducing a low density recording medium having little intersymbol interference, the approximation based on equation (1) above may not result in high accuracy.

FIG. 12 illustrates the results of a simulation of the SNR of the clock phase displacement θ detected using an optical disk readout signal. The graph shown in FIG. 12 is based on the recording density at 0.35 μm/bit in a conventional system. It can be seen from FIG. 12 that, although the present invention does not exhibit a special effect where the recording density is low, a significantly high effect (that is, improvement in SNR) can be obtained where the recording density is high. From FIG. 12, it can be seen that the system of the present invention can extract a clock signal from a recording medium on which high density information is recorded and which includes substantial intersymbol interference.

In summary, with the clock signal extraction system of the present invention, accurate phase information can be detected from a reproduction system which includes substantial intersymbol interference and exhibits a large amount of reproduction clock jitter upon reproduction by an ordinary PLL system. Consequently, accurate sampling can be achieved using the present invention. Where the clock extraction system is combined with viterbi detection, a significant advantage can be expected in that a high SNR can be obtained even by reproduction from information recorded in a high density.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
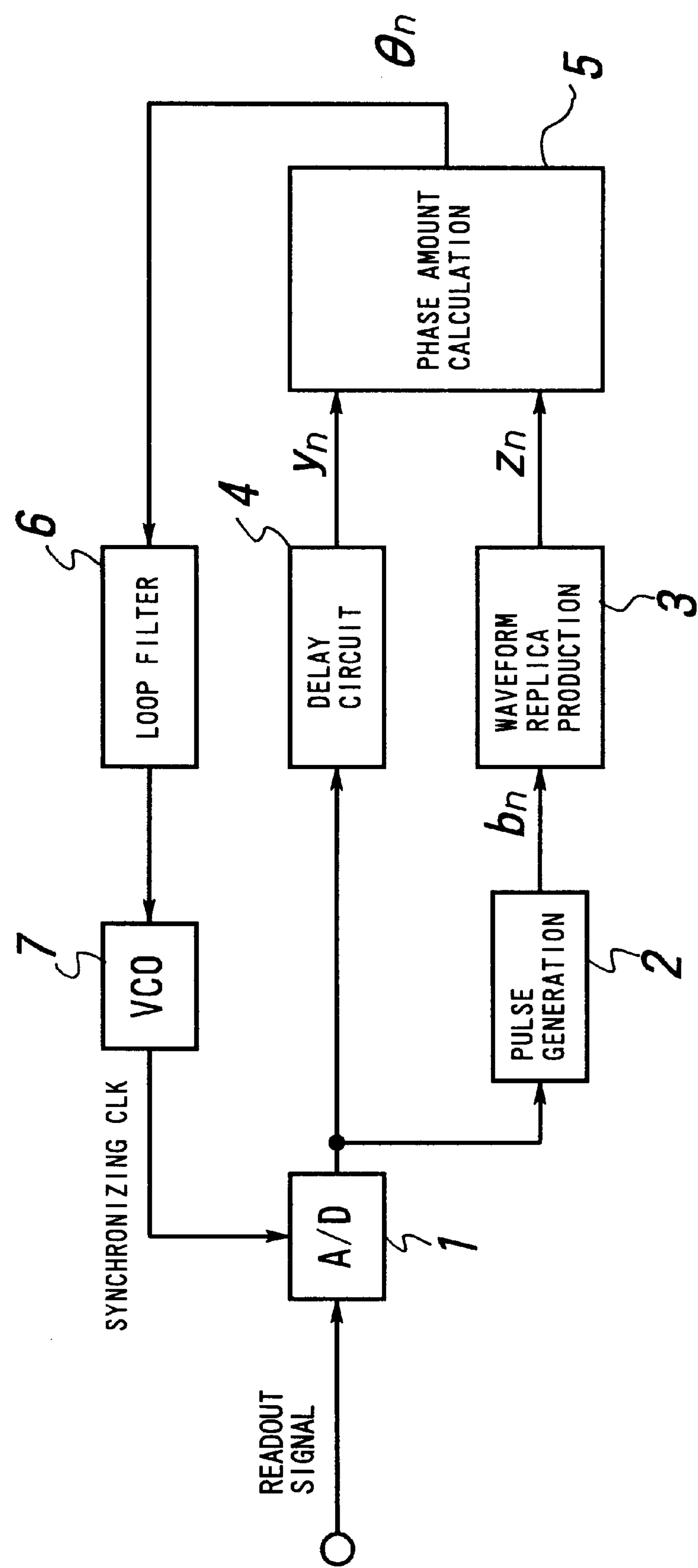
FIG. 1 is a block diagram showing a clock signal extraction system for a high density recording apparatus to which the present invention is applied.

Referring to FIG. 1, there is shown a clock signal extraction system for a high density recording apparatus to which the present invention is applied. The system shown includes an analog to digital converter (A/D) 1, a pulse generation circuit 2, a waveform replica production circuit 3, a delay circuit 4, a phase amount calculation circuit 5, a loop filter 6 and a voltage controlled oscillator (VCO) 7.

In the system shown in FIG. 1, a readout signal is sampled at according to the timing of an oscillation clock signal outputted from the VCO 7 by the analog to digital converter 1 of, for example, 8 data bits. The pulse generation circuit 2 reproduces a binary information sequence $b_n$ from sample data of the readout signal waveform outputted from the analog to digital converter 1. The binary information sequence $b_n$ is inputted to the waveform replica production circuit 3 which has a characteristic equal to the channel characteristic between the head and the recording medium, and the waveform replica production circuit 3 produces replica data $Z_n$. It is to be noted that the characteristic of the waveform replica production circuit 3 is set in advance based a result of an estimation from an impulse response of the reproduction system or the like.

Meanwhile, the delay circuit 4, which has a delay amount set thereto corresponding to a time delay by the pulse generation circuit 2 and the waveform replica production circuit 3, delays the sample data outputted from the analog to digital converter 1 by the delay amount to produce time corrected data $y_n$.

The time corrected data $y_n$ and the replica data $Z_n$ are inputted to the phase amount calculation circuit 5, by which a phase amount $\theta_n$ at each sampling point is calculated. Then, high frequency components of the phase amount $\theta_n$ are removed by the loop filter 6, and a clock signal (synchronizing CLK) having a frequency corresponding to an input voltage which is the output of the loop filter 6 is produced by the VCO 7. The clock signal is fed back to the analog to digital converter 1, thereby forming a phase locked loop which performs a follow-up operation.

Figure 2:
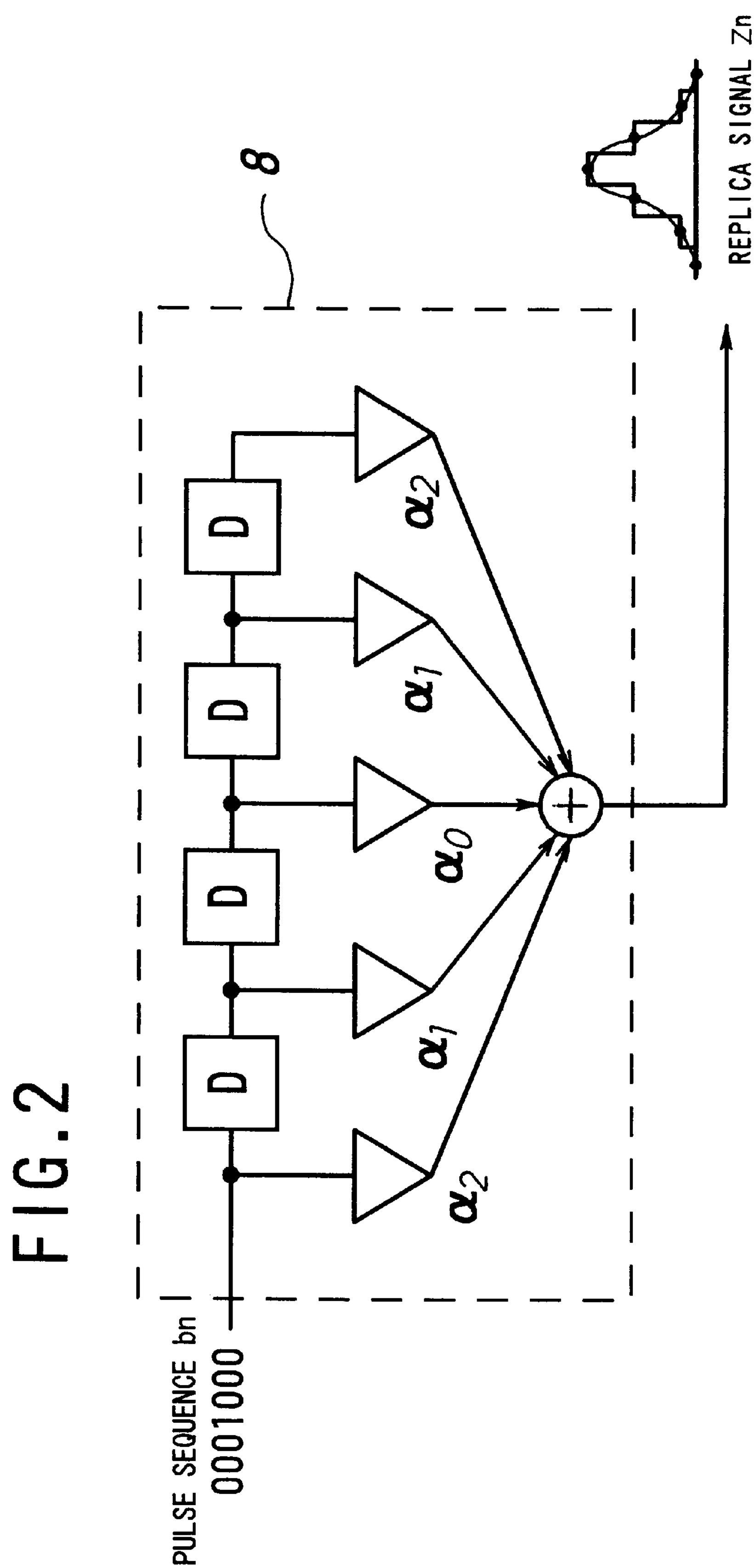
FIG. 2 is a block diagram showing a waveform replica production circuit in the clock signal extraction system of FIG. 1.

Referring to FIG. 2, the waveform replica production circuit 3 is formed from a transversal filter 8. The filter 8 converts a data sequence (pulse sequence $b_n$) inputted thereto into an amplitude value sequence (replica signal $Z_n$) having intersymbol interferences. Tap coefficients ($\alpha_\theta$ to $\alpha_2$) are set in advance based on a result of an estimation from an impulse response of the reproduction system or the like. It is to be noted that the filter 8 shown in FIG. 2, which is a digital filter of the FIR type whose tap number (order number) is 4 and whose tap coefficients are symmetrical, is only an example of the reproduction system for an optical disk or the like, and naturally the waveform replica production circuit in the clock signal extraction system of the present invention is not limited to the specific construction.

Figure 3:
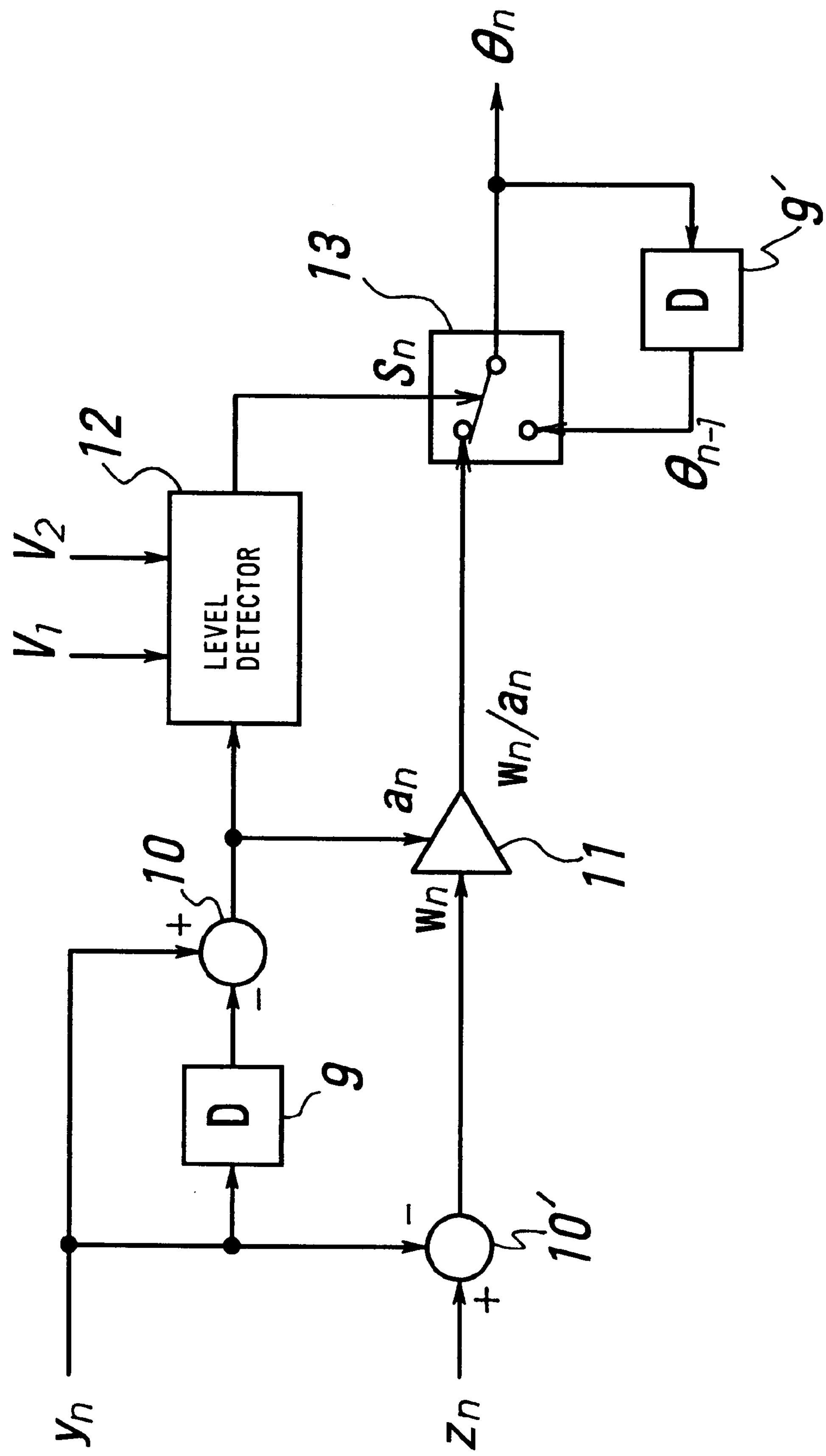
FIG. 3 is a block diagram showing a phase amount calculation circuit in the clock signal extraction system of FIG. 1.

FIG. 3 shows an example of a construction of the phase amount calculation circuit 5 in the clock signal extraction system described above with reference to FIG. 1. Referring to FIG. 3, in order to produce a differentiation signal (difference signal) from a sample value $y_n$, the output of a one clock delay circuit 9 and the sample value $y_n$ are inputted to a first subtraction circuit 10, by which an one clock difference signal $a_n$ ($=y_n-y_{n-1}$) is produced.

A second subtraction circuit 10' produces a difference signal $W_n$ ($=Z_n-y_n$) representing a difference between the sample value $y_n$ and the replica data $Z_n$. The difference signal $W_n$ and the one clock difference signal $q_n$ are inputted to a divider 11, by which the difference signal $W_n$ is divided by the one clock difference signal an. The quotient $W_n/a_n$ of the division is outputted from the divider 11.

Here, since a great error is produced when the one clock difference signal $a_n$ is equal to 0, a level detector 12 monitors the one clock difference signal $a_n$ and outputs a level signal $S_n$ which is, for example, active (for example, in a high level) when $V_1<a_n<V_2$ (where $V_1$ and $V_2$ are predetermined values) but is inactive (in a low level) in any other case.

The level signal $S_n$ is inputted as a switching control signal for an electronic switch 13 which may be, for example, a multiplexer or a selector. Consequently, when the value of the one clock difference signal $a_n$ is not in the proximity of zero, the electronic switch 13 outputs the output $W_n/a_n$ of the divider 11. When the value of the one clock difference signal $a_n$ is in the proximity of zero, however the electronic switch 13 outputs an output value $\theta_{n-1}$ delayed one clock interval by a one clock delay circuit 9', that is, an output value at the preceding clock, as a phase displacement amount.

Figure 4:
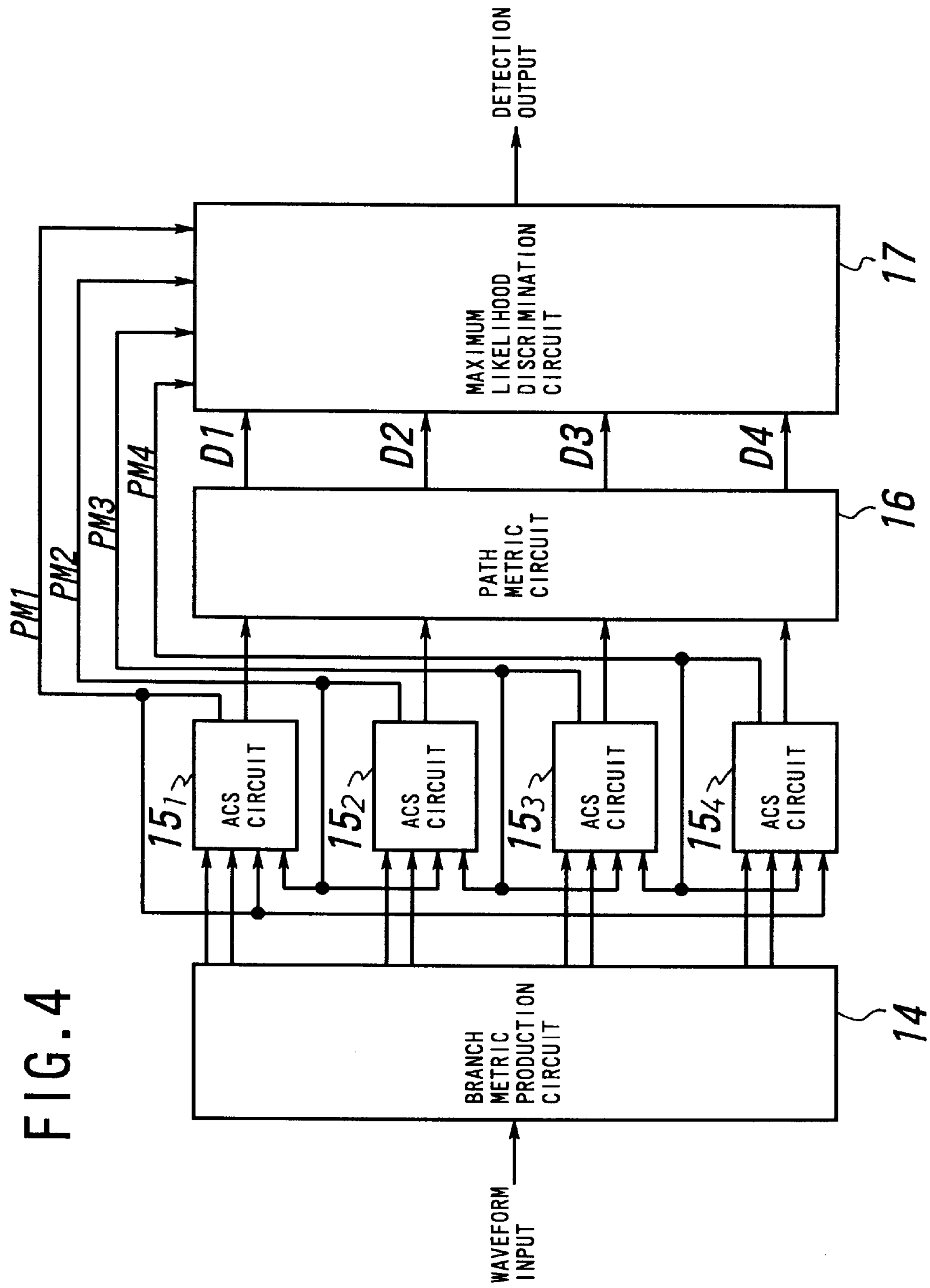
FIG. 4 is a block diagram showing a pulse generation circuit in the clock signal extraction system of FIG. 1.

FIG. 4 shows an example of a construction of the pulse generation circuit 2 shown in FIG. 1. Referring to FIG. 4, a branch metric production circuit 14 calculates a plurality of branch metrics from input data, and ACS (addition, comparison and selection) circuits $\mathbf{15}_1$ to $\mathbf{15}_4$ perform addition, comparison and selection of the branch metrics and path metric values PM1 to PM4 of the preceding cycle.

The selection information of the ACS circuits $\mathbf{15}_1$ to $\mathbf{15}_4$ is inputted to a path memory circuit 16 having a plurality of stages, and a maximum likelihood discrimination circuit 17 selects, from outputs D1 to D4 from the last stage of the path metric circuit 16, a path having a maximum likelihood based on the path metric values PM1 to PM4 of the preceding cycle.

Figure 8:
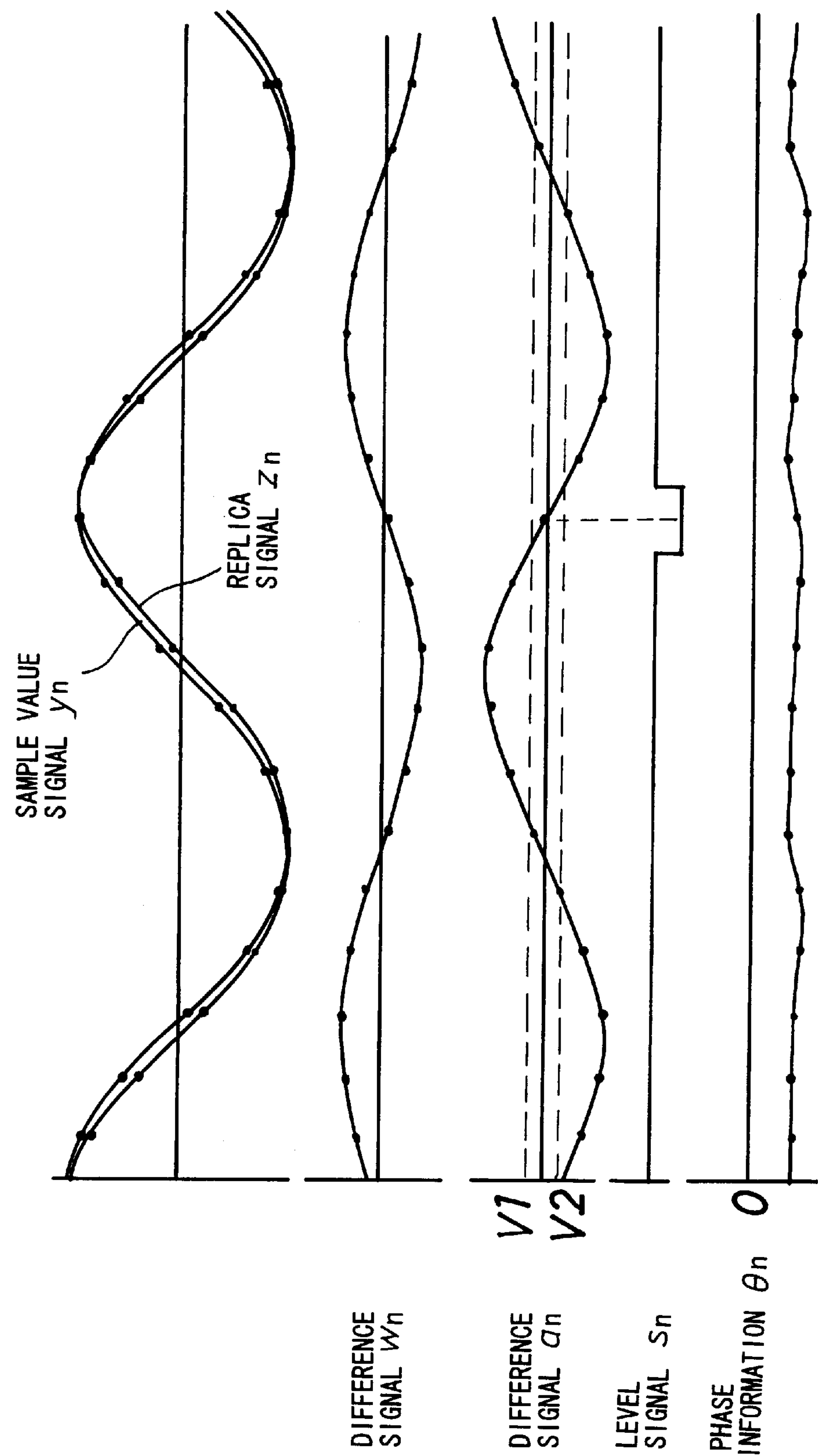
FIGS. 8, 9 and 10 are waveform diagrams illustrating waveforms sampled at late, fast and appropriate timings, respectively, and the internal condition of the clock signal extraction system of FIG. 1.
Figure 9:
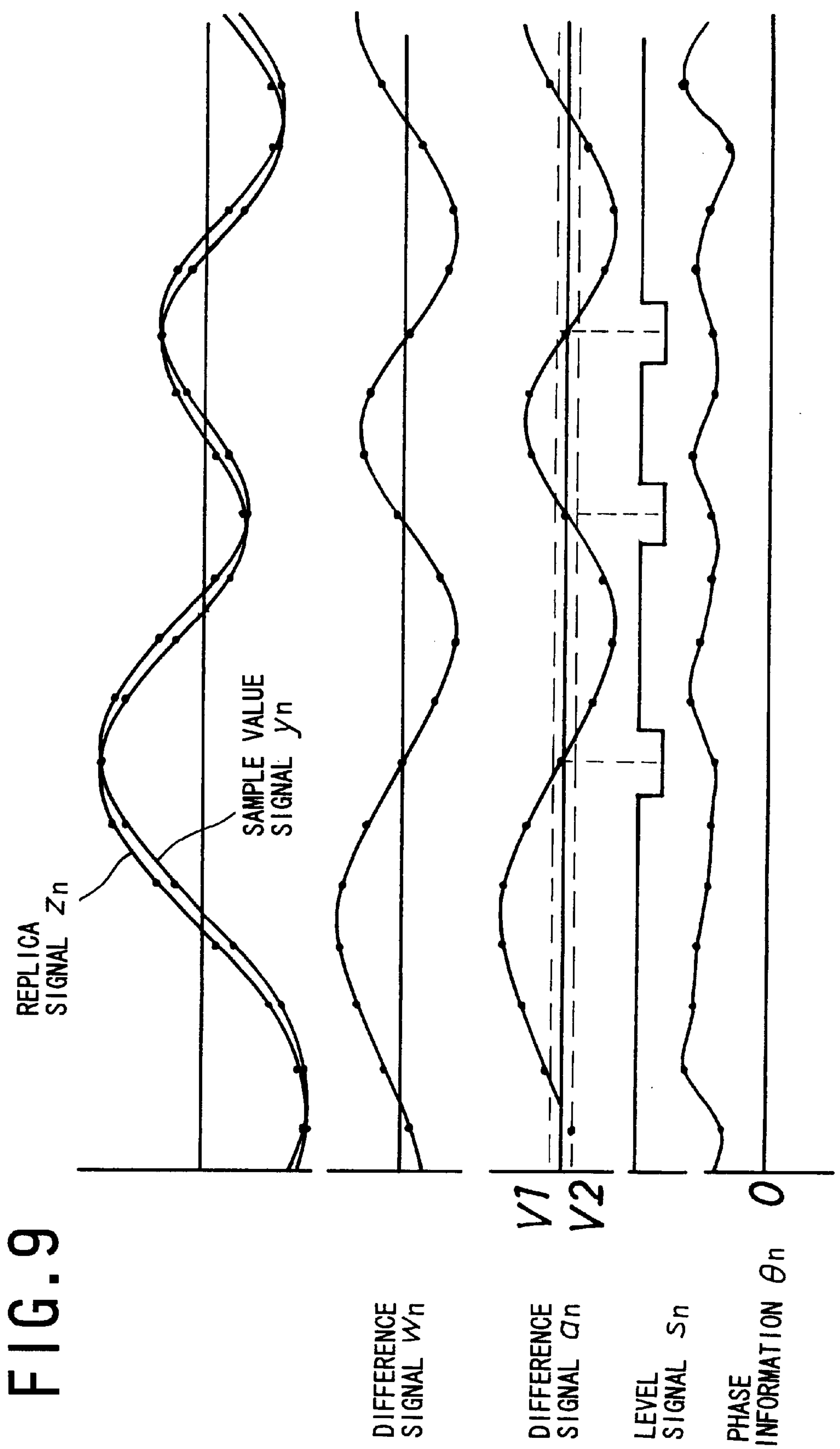
Figure 10:
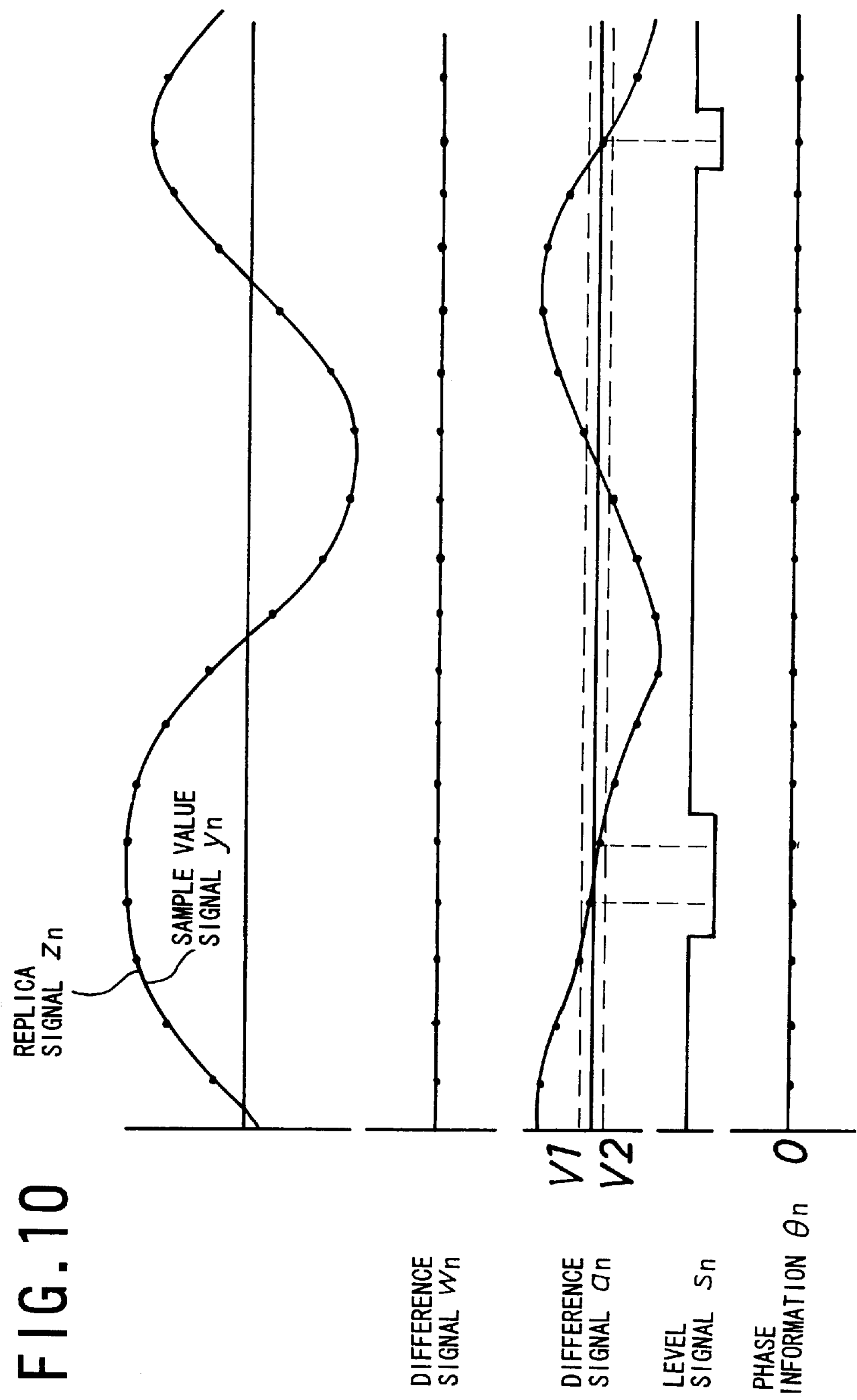
Figure 11:
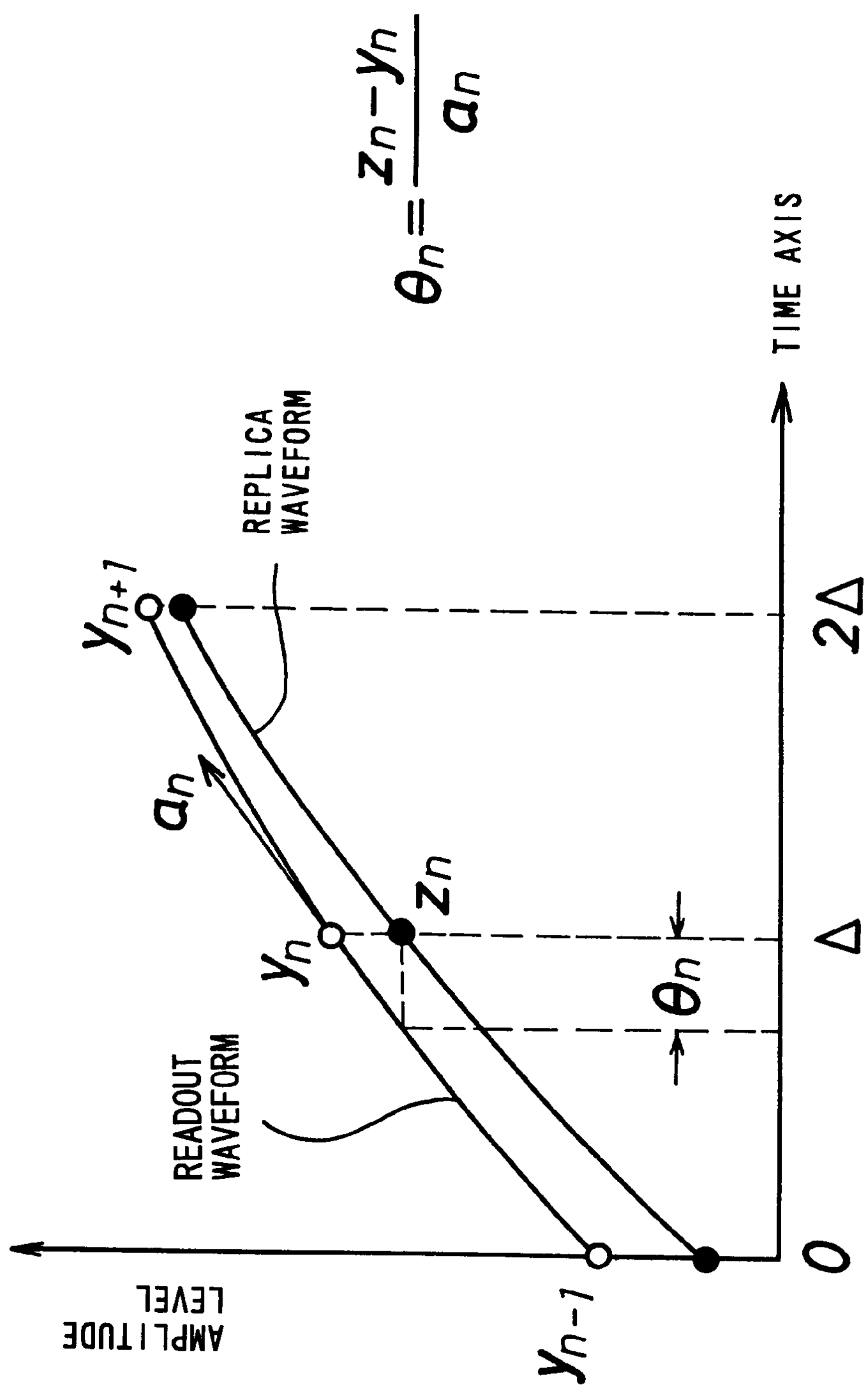
FIG. 11 is a diagram illustrating the principle of the present invention and illustrating calculation of a phase amount.
Figure 12:
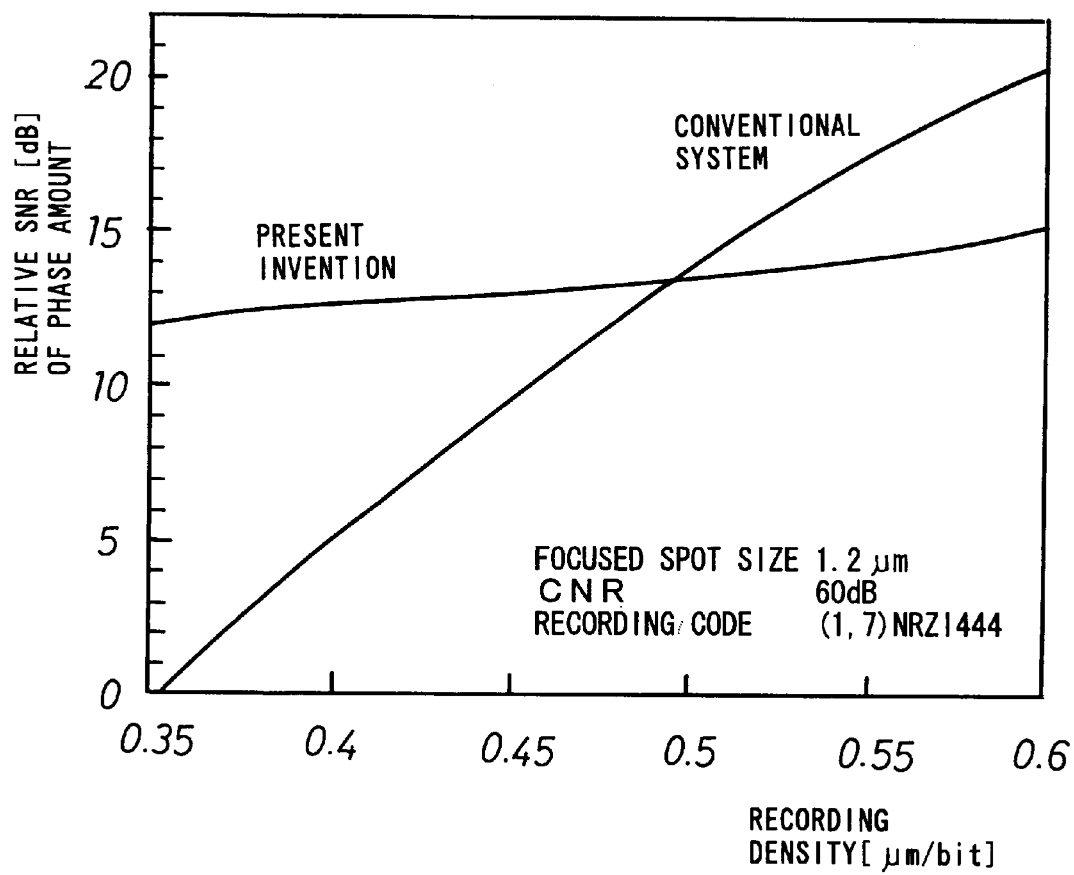
FIG. 12 is a diagram illustrating a result of a simulation of a phase amount relative SNR to a recording density for comparison between the clock signal extraction system of the present invention and a conventional clock signal extraction system.
Figure 13:
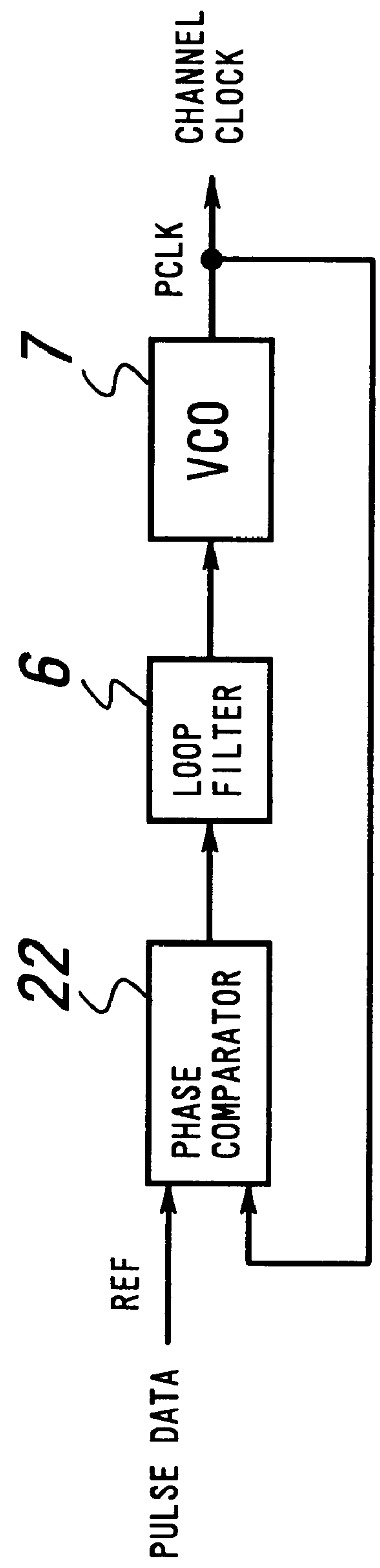
FIG. 13 is a block diagram showing a conventional clock signal extraction system.

FIGS. 8, 9 and 10 illustrate the timing waveforms of the signals of the phase amount calculation circuit 5 of FIG. 3, namely the sample value $y_n$, replica signal $Z_n$, difference signal $W_n$, difference signal $a_n$, level signal $S_n$ and phase information $\theta_n$, when the timing of sampling is late, fast and appropriate, respectively. Referring to FIGS. 8 to 10, when the one clock difference signal $a_n$ is within the range between $V_1$ and $V_2$, the level signal $S_n$ is active (shown at a low level in FIGS. 8 to 10) and the value $\theta_{n-1}$ at the preceding clock is outputted as phase information $\theta_n$. Then, when some phase displacement is involved as seen in FIG. 8 or 9 (in an asynchronous condition), pulling-in is performed rapidly to another condition wherein the phase amount $\theta_n$ is 0 as seen in FIG. 10. In other words, in the present embodiment, phase synchronism control for the accurate extraction of a synchronizing clock signal can be performed even from a readout waveform reproduced from a recording medium on which information is recorded in a high density and including substantial intersymbol interference. Thus, the clock extraction circuit performs pulling-in quickly and has a high degree of follow-up accuracy.

<Embodiment 2>

Figure 5:
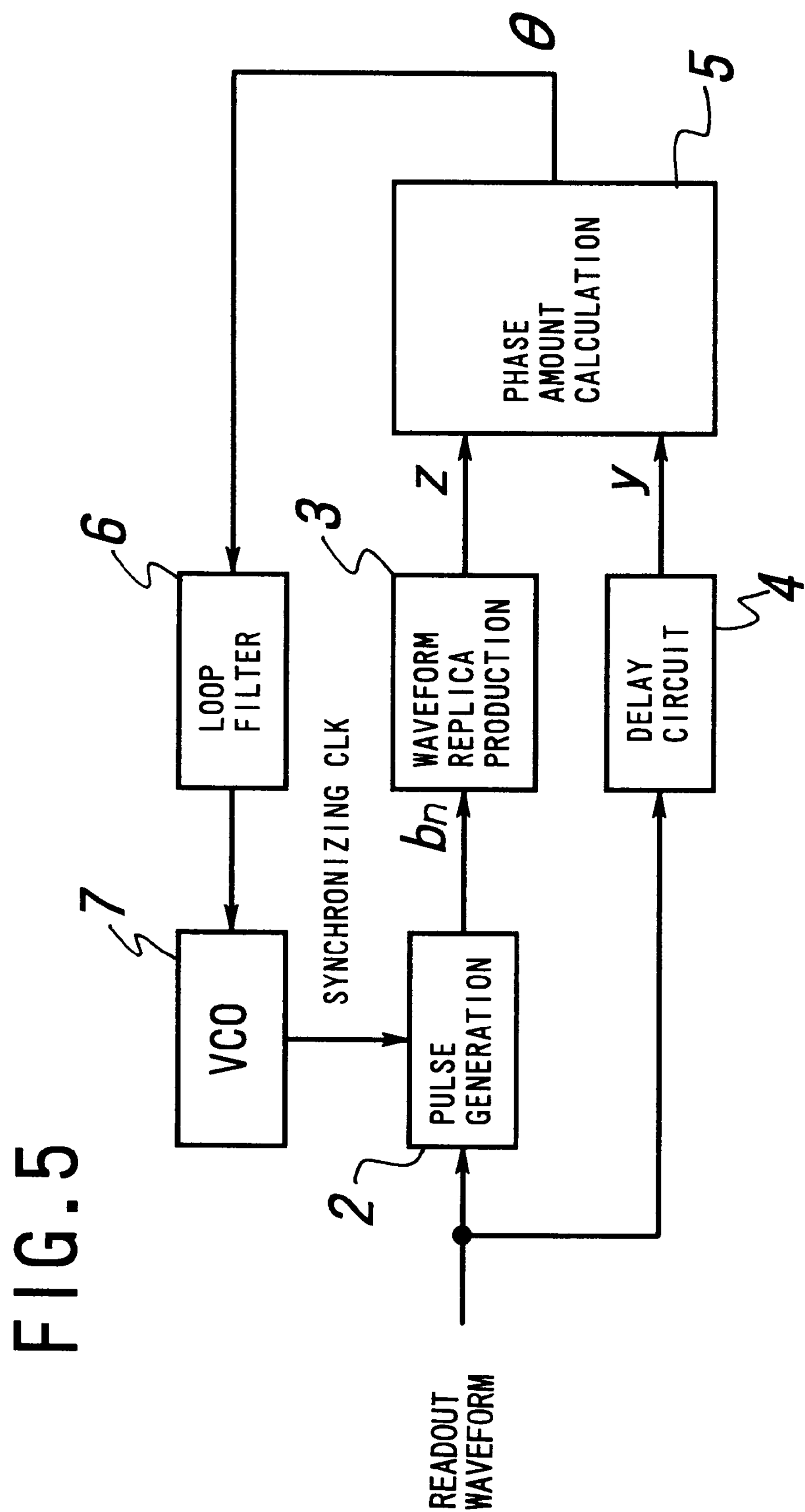
FIG. 5 is a block diagram showing another clock signal extraction system for a high density recording medium to which the present invention is applied.

FIG. 5 shows a construction of another clock signal extraction system for a high density recording apparatus to which the present invention is applied. Referring to FIG. 5, the system shown includes a pulse generation circuit 2, a waveform replica production circuit 3, a delay circuit 4, a phase amount calculation circuit 5, a loop filter 6 and a VCO 7.

In the system shown in FIG. 5, an analog readout signal reproduced from a recording medium is supplied to the pulse generation circuit 2, by which a binary information sequence $b_n$ is reproduced from the analog readout signal using an oscillation clock signal of the VCO 7. The binary information sequence $b_n$ is inputted to the waveform replica production circuit 3 which has a characteristic same as the channel characteristic between the head and the medium. The waveform replica production circuit 3 thus produces replica data z from the binary information sequence $b_n$. It is to be noted that the characteristic of the waveform replica production circuit 3 is set in advance based on a result of an estimation from an impulse response of the reproduction system or the like.

The delay circuit 4, which has a delay amount set thereto corresponding to a delay time by the pulse generation circuit 2 and the waveform replica production circuit 3, delays the input analog readout signal by the delay amount to produce time corrected data y (analog signal).

The time corrected data y and the replica data z are inputted to the phase amount calculation circuit 5, by which a phase amount θ at each point of time is calculated. Then, high frequency components of the phase amount θ are removed by the loop filter 6, and a clock signal having a frequency corresponding to an input voltage which is the output of the loop filter 6 is produced by the VCO 7. The clock signal is fed back to the pulse generation circuit 2, thereby forming a phase locked loop which performs a follow-up operation.

Figure 6:
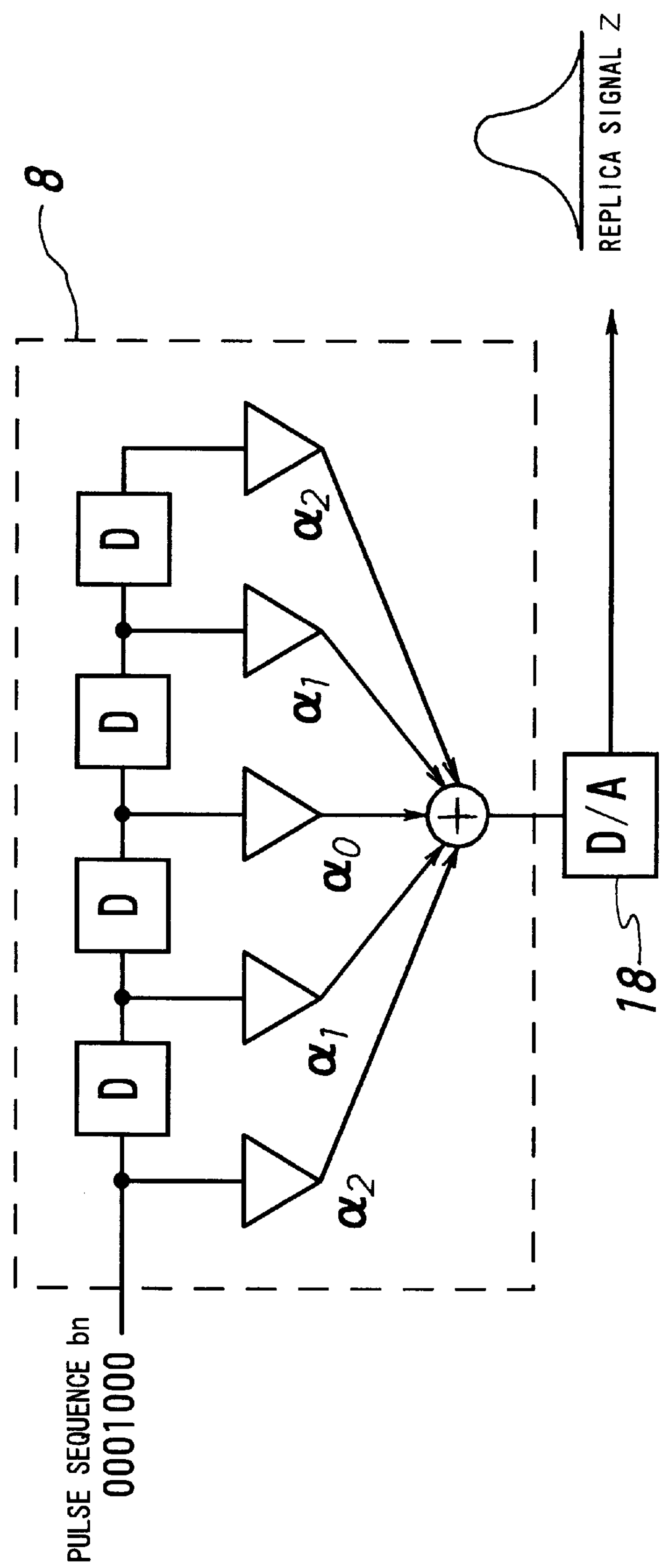
FIG. 6 is a block diagram showing a waveform replica production circuit in the clock signal extraction system of FIG. 5.

FIG. 6 shows an example of a construction of the waveform replica production circuit 3 in the clock signal extraction circuit of FIG. 5. Referring to FIG. 6, the waveform replica production circuit 3 is formed from a transversal filter 8 and a digital to analog converter (D/A) 18. The transversal filter 8 converts a data sequence (pulse sequence $b_n$) inputted thereto into an amplitude value sequence (replica signal $Z_n$) having intersymbol interferences. The replica data $Z_n$ is converted into an analog amount z by the digital to analog converter 18, and the analog value z is outputted as an output of the waveform replica production circuit 3. Tap coefficients ($\alpha_\theta$ to $\alpha_2$) of the transversal filter 8 are set in advance based on a result of an estimation from an impulse response of the reproduction system or the like. It is to be noted that, although the filter 8 shown in FIG. 6 is a digital filter of the FIR type whose tap number is 4, the waveform replica production circuit in the clock signal extraction system of the present invention is not limited to that specific construction.

Figure 7:
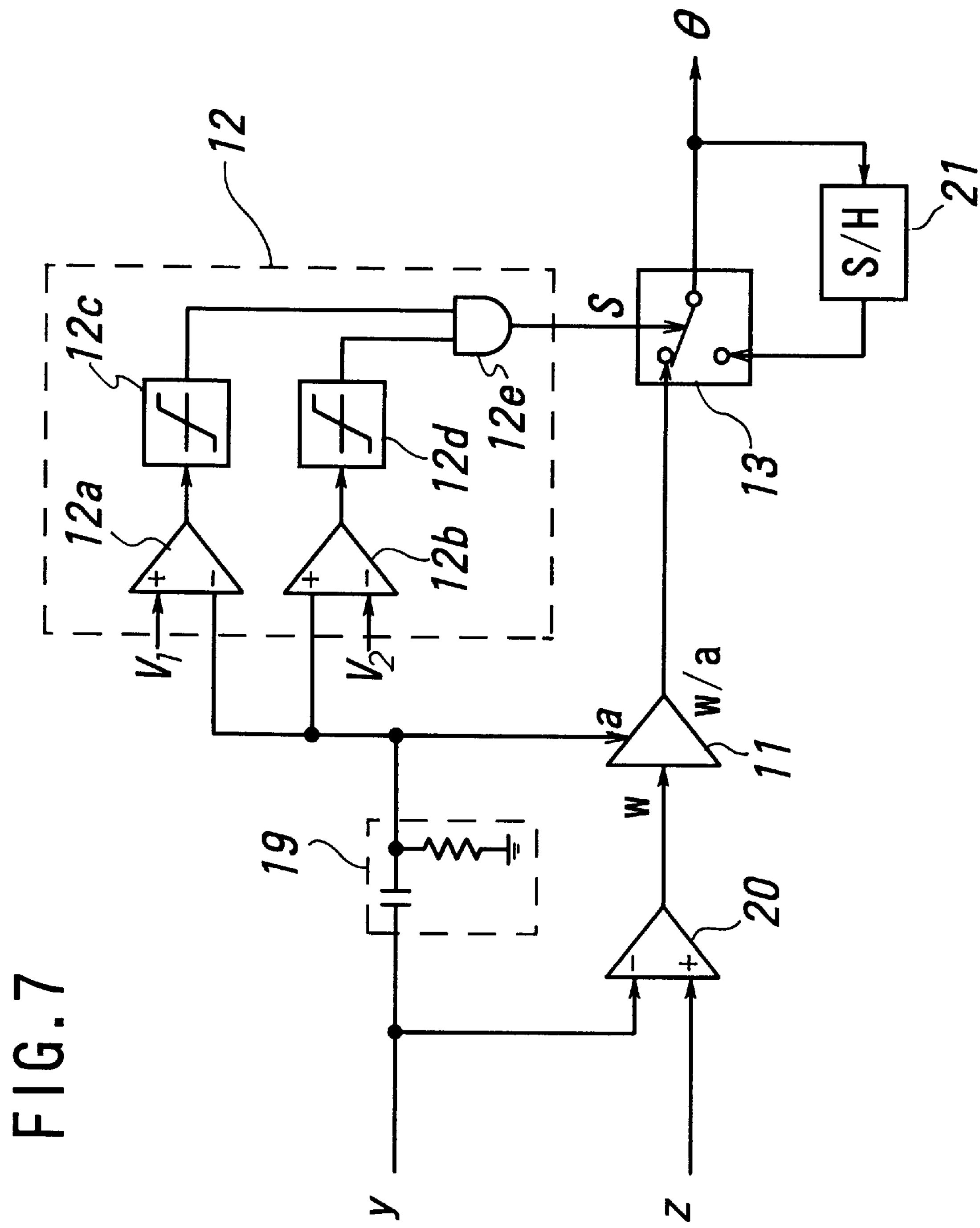
FIG. 7 is a block diagram showing a phase amount calculation circuit in the clock signal extraction system of FIG. 5.

FIG. 7 shows an example of a construction of the phase amount calculation circuit 5 in the clock extraction circuit of FIG. 5. Referring to FIG. 7, a CR differentiation circuit 19 produces a differentiation signal a from the time corrected the readout signal y. A subtraction circuit 20 produces a signal w from the replica waveform z and the readout signal y, and a divider 11 divides the signal w by the differentiation signal a to produce a signal w/a.

Here, since a great error is produced when the differentiation signal a is equal to 0, a level detector 12 supervises the differentiation signal a and outputs a level signal s. In particular, in the level detector 12, the differentiation signal a is inputted to a negative input terminal and a positive input terminal of first and second comparators **12*a* and 12*b*, respectively. The outputs of the first and second comparators 12*a* and 12*b* are inputted to an AND circuit 12*e* via first and second waveform shaping circuits 12*c* and 12*d* (which may each be, for example, a Schmitt trigger circuit), respectively. The AND circuit 12*e* thus outputs a level signal s. Here, when both of the outputs of the first and second comparators 12*a* and 12*b* are at a high level, the AND circuit 12*e* outputs a high level. The level signal s is inputted to a switching control terminal of an electronic switch 13. When the value of the differentiation signal a is not in the proximity of zero, the electronic switch 13 outputs the output of the divider 11 as it is, but when the value of the differentiation signal a is in the proximity of 0 (when it is within a range between two threshold values $V_1$ and $V_2$), the electronic switch 13 outputs the last output value which has been held in a sample and hold circuit (S/H) 21**.

Also in the present embodiment, similarly as in the first embodiment described above, phase synchronism control for accurate extraction of a synchronizing clock signal can be performed even from a readout waveform reproduced from a recording medium on which information is recorded in a high density and including much intersymbol interference.

Having now fully described the invention, it will be apparent to one of ordinary skill in the art that many changes and modifications can be made thereto without departing from the spirit and scope of the invention as set forth herein.

What is claimed is:

1. A clock signal extraction system for a high density recording apparatus, comprising:

an analog to digital converter for sampling an analog signal reproduced from a recording medium in synchronism with a clock signal to produce a sample signal;

a pulse generation circuit for converting said sample signal from said analog to digital converter into binary information in synchronism with said clock signal;

a waveform replica production circuit for producing an output waveform signal in phase with the binary information from said pulse generation circuit via synchronism with said clock signal;

a delay circuit for producing a delayed sample signal from the sample signal of said analog to digital converter by a fixed synchronous time interval corresponding with said clock signal;

a phase calculation circuit for producing a phase displacement signal between said output signal waveform signal and said delayed sample signal of said delay circuit;

a loop filter operable to receive and filter said phase displacement signal to produce a filtered signal; and a voltage controlled oscillator for controlling a frequency of the clock signal in response to said filtered signal.

2. A clock signal extraction system for a high density recording apparatus as claimed in claim 1, wherein said waveform replica production circuit includes a transversal filter.

3. A clock signal extraction system for a high density recording apparatus as claimed in claim 1, wherein said phase calculation circuit includes:

a delay element for delaying said sample signal from said analog to digital converter by one clock period of said clock signal;

a first subtractor for producing a difference signal between said sample signal and an output signal of said delay element;

a level detector for comparing the difference signal with a threshold level;

a second subtractor for producing a difference signal between said output waveform signal and said sample signal;

a divider for dividing an output of said second subtractor by the output of said first subtractor; and a switch circuit for selectively outputting an output of said divider or a signal obtained by delaying the output of said divider by one clock period of said clock signal using an output of said level detector as a switching control signal.

4. A clock signal extraction system for a high density recording apparatus as claimed in claim 3, wherein said level detector compares the difference signal from said first subtractor with two threshold levels, and said switch circuit selectively outputs the signal obtained by delaying the output of said divider by one clock period of said clock signal using the output of said level detector as a switching control signal when the output of said first subtractor is within a range between the two threshold levels.

5. A clock signal extraction system for a high density recording apparatus as claimed in claim 1, wherein said pulse generation circuit comprises a viterbi detector.

* * * * *